Figure 1:
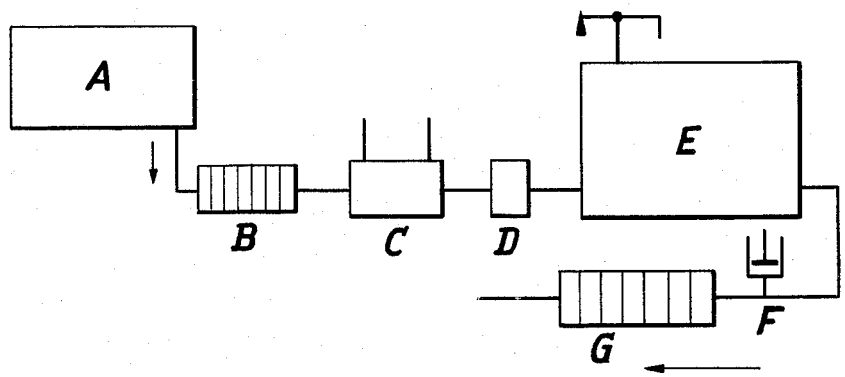

Dec. 29, 1964         K. J. RAIBLE         3,163,538

METHOD FOR INCREASING THE ALBUMEN STABILITY OF BEER

Filed March 26, 1963

INVENTOR.
KARL J. RAIBLE
BY
Harness, Dickey & Pierce
ATTORNEYS

United States Patent Office

3,163,538
Patented Dec. 29, 1964

1

3,163,538
METHOD FOR INCREASING THE ALBUMEN
STABILITY OF BEER
Karl J. Raible, Munich, Germany, assignor to Aktiengesellschaft für Brauereiindustrie, Glarus, Basel, Switzerland
Filed Mar. 26, 1963, Ser. No. 268,046
Claims priority, application Germany, Apr. 5, 1962, A 39,883 IVa/6d; Switzerland, June 26, 1962, 7,553/62; Germany, Nov. 23, 1962, A 41,693
11 Claims. (Cl. 99—48)

The invention relates to a method for the treatment of beer using finely ground coarse to medium pored silica gel as an adsorbing agent the inner surface of which is about 200–600 m.$^2$/g., with a pore volume of about 0.5 to 1.5 ml./g. and a pore diameter of about 40 to 180 A., said adsorbing agent being eliminated again from the beer after a sufficiently long period of influence has elapsed. This application is a continuation-in-part of application Serial No. 147,037, filed October 23, 1961 and now abandoned.

It has already been proposed to use a finely ground silica gel to increase the albumen stability of the beer the inner surface of which gel is 200 to 400 m.$^2$/g. with a pore volume of 0.6 to 1.2 ml./g. and a pore diameter of 60 to 150 A. In connection with this, provision has also been made to subject the silica gel to an acid after-treatment and to carry the subsequent treatment with water to such an extent that the dry end product has weakly acid character nearly approaching neutral.

It has now been found that even if a finely ground xeric silica gel is necessary to increase the albumen stability of the beer, the following characteristics must be taken into consideration as being almost of equal order with respect to the suitability of the xeric gel for the purpose of stabilizing the albumen in the beer, with at least one of said characteristics being bound to be present to increase the albumen stability of the beer with the aid of the silica gel.

(a) The silica gel is porous in such a manner that the inner surface thereof is about 200–400 m.$^2$/g.; the pore volume is about 0.5 to 1.2 ml./g.; and the diameter of the pores is about 60 to 150 A., or (b) The silica gel has a weakly acid or neutral reaction of such a type that it has a pH value of more than 4.0 and less than 8.0 in a 5% suspension in distilled water, or (c) The ground silica gel is carried out to such a degree that at least 75% by weight are passing through a screen of about 44 micron mesh size (325 mesh).

It has been found that these three properties of the silica gel concerning its capability of increasing the albumen stability of beer are effective on one another such that with an optimum coarse-porous character of the silica gel in the sense of the condition mentioned under (a) one may renounce both the weakly acid to neutral reaction in accordance with the requirement under (b) and the finest grinding in accordance with the requirement under (c) above.

If, however, the pH value of the silica gel is adjusted to an optimum value in accordance with the requirements under (b) above one may successfully use in addition to coarse-porous silica gels, medium pored silica gels with a normal grinding to increase the albumen stability of beer.

If one finally subjects the silica gel to a finest grinding in accordance with the requirement as stated under (c), one may use not only coarse-porous but also medium-pored silica gel for the albumen stabilization of beer. Such a most finely ground silica gel in accordance with the requirement as stated under (c) need neither be subjected to a treatment in accordance with the requirement as stated under (b) in order to obtain an increased albumen stability of the beer.

This effect of the finest grinding is astonishing because the inner surface, the volume of the pores and the diameter of the pores of the silica gel are practically not changed by the degree of the grinding. The reason for this phenomenon resides in the fact that the silica gel is built up from many fine particles of a substance. The pores of the silica gel are formed by the cavities between these particles; therefore, with a fine grinding one only decomposes the coarse aggregates of the substance into individual particles without substantially changing the analytic data such as surface, volume of pores and pore diameter.

It has now unexpectedly been detected that extremely fine-ground silica gel is more selectively effective on the turbidity caused by the albumen substances than the less finely ground material. By the application of normally ground silica gel on the one hand and most finely ground silica gel on the other hand, the decrease of the nitrogen content is practically the same while the ammonium sulphate precipitation limit with most finely ground silica gel is substantially increased than it is the case with a normally ground gel.

The effectiveness of the silica gel in stabilizing the albumen is still enhanced very much by carrying the grinding extremely far, that means to such a degree that 90% by weight and more of the silica gel pass through a screen of 44 micron mesh size. An optimum product, however, will fulfill all the three requirements as mentioned under (a), (b), and (c) above.

It has furthermore been found that said silica gel added to the beer influences not only the albumen relationship of the beer but also the micro-organisms contained in the beer and the living conditions necessary for the development thereof such that a beer treated with silica gel in such a manner is not subjected to a microbiological decomposition. This favourable effect of the silica gel is to be attributed to three causes:

A. The silica gel particles which are suspended in the beer also adsorb micro-organism cells. If the silica gel is prepared by stirring in the beer, then it will gradually settle and take the microbic cells adhering thereto down with it to the ground. The supernatant liquid consequently contains less microbic cells which may then more easily be removed completely during the subsequent filtration so that thereby a substrate is obtained which is rendered poor in micro-organisms and even sterile in many cases and may thus naturally be kept in a good state for a longer time from a biological point of view.

B. Said silica gel particles consolidate the filter cake in dependence on the degree of fineness of said silica gel particles during the filtration of a beer mixed with silica gel. Owing to this restriction of the channels of the filter cake, the micro-organisms are better retained during filtration. There is furthermore the adsorbing effect of the silica gel on the micro-organisms cells as mentioned under A so that also for this reason when filtering a beer containing micro-organisms the filtrate is substantially poorer in cells than if only a filter cake of kieselguhr or cellulose is present. This improved filtration effect contributes to an enhanced durability.

C. Finally, it was found that the silica gel obviously absorbs from the beer also substances which are necessary for the procreation of yeast cells and bacteria, too. It has not been unambiguously clarified as yet what substances are removed. It appears that this is dependent also on the type of substrate in question. At any rate, it can be observed that in the beer which has preliminarily been treated with a sufficient amount of silica gel (more than about 50 g./hl.) yeast cell formation is stopped so that one may even gather the impression that a preserving agent was added to the beer.

If therefore the beer is mixed with a finely ground silica gel which has the properties as described above and the silica gel is filtered off after a short period of influence and if the beer is racked with sufficient care to avoid an after-injection, it need not be mixed with a chemical preserving agent nor is it necessary to apply any physical processes such as for instance pasteurization, sterilization or the like to obtain a product having a sufficient durability. The effect of albumen stabilization results along with the enhanced biological durability of the beer, and it depends on the special circumstances whether more stress is laid on one or on the other effect or whether both effects are to be obtained.

In accordance with the invention, the silica gel may be used also to shorten the time of storage for bottom-fermented beer. In this connection, the silica gel serves above all for the purpose of removing from the beer within a short period of time the non-volatile substances of undesired taste which have so far been removed during the time of storage.

The preparation of bottom-fermented beer consists of the following main steps which take about the following times:

(1) Brewing process 6–8 hours;
(2) Main fermentation 6–8 days;
(3) Time of storage 4–10 weeks.

In the course of the last years, several attempts have been made to rationalize the brewing process. Processes for continuous preparation of the wort have been proposed, the purpose of which it is to render the brewing process more economical, attempts have also been made to perform the main fermentation continuously. It is the object of the present invention to drastically shorten also the time of storage of the beer or even eliminate it completely because this last main step in the preparation of beer causes very high costs. Drastically shortening the time of storage in this connection means a reduction of the time of storage to a maximum of 10–14 days.

For a better explanation of the invention, at first, a discussion concerning the processes running off during the period of storage will now follow.

(1) *Final fermentation of the extract.*—During the main fermentation, the extract of the wort is usually fermented to about 60 to 65%. During the subsequent time of storage, the fermentation will then still continue possibly to such a degree that the final degree of fermentation is more or less reached. But this final fermentation need not necessarily be carried through only in the storage cellar; it may be effected as well during the main fermentation.

(2) *Saturation of the beer with carbon dioxide.*—Saturation is effected in that the final fermentation of the beer is carried out under counterpressure so that the beer will be enriched with .5% carbon dioxide or even more. This enrichment with carbon dioxide may also be effected by carrying through the main fermentation or at least the final state thereof in closed vessels under counterpressure. But a substantially more preferable way consists in re-covering the carbon dioxide of the fermentation process and adding to the beer such an amount thereof as is required at any time.

(3) *Separation of the yeast.*—The beer still contains a part of the yeast from the main fermentation which settles gradually during the time of storage. If the final fermentation is reached already during the main fermentation, the presence of yeast during the time of storage is no longer necessary. It may be removed by filtration or separation substantially more effectively than would be possible by natural sedimentation.

(4) *Clarification of the beer.*—The natural clarification of the beer during the time of storage may have been of importance formerly. Nowadays one obtains better clarification by filtration.

(5) *Maturation of flavour.*—In this connection, two viewpoints will have to be taken into consideration: the removal of volatile young bouquet substances and the decomposition of non-volatile flavour substances. The removal of the volatile young bouquet substances, in conventional brewing operations, is effected by the carbon dioxide which removes said substances from the beer during the after-fermentation in the storage cellar by washing out. But this may be effected as well by subjecting the beer to a washing process using purified carbon dioxide.

It has now been found that the non-volatile flavouring substances may be removed by a treatment of the beer with a silica gel having an adsorbing effect of the type characterized above.

(6) *Enzymatic albumen stabilization of the beer.*—In the second phase of the time of storage, when the individual steps mentioned under 1–5 above have been completed to a considerable degree, the temperature of the beer is lowered to about 0° C. and below. By this step albumen compounds that are instable in the cold are precipitated and are then removed by the subsequent filtration. To remove these instable albumen compounds, there are also means that are more effective, for instance precipitating means, albumen decomposing enzymes or adsorbing agents of which, in Germany, only the last-mentioned means can be employed due to the purity rules in this country.

In consideration of the above mentioned individual steps carried through when storing the beer, in accordance with the invention, the following way to shorten or eliminate completely the time of storage without however impairing the quality of the beer, is indicated.

The beer is already brought to the required degree of expelling fermentation in the fermentation cellar by suitably controlling the fermentation. The removal of the volatile young bouquet substances is effected by a wash with carbon dioxide. A special method of said carbon dioxide wash consists in that one introduces into the beer under counterpressure a carbon dioxide content higher than that which is finally desired, during the main fermentation of the beer. Release of the excessive carbon dioxide is effected by a reduction in pressure prior to the final filtration of the beer. The gas escaping thereby removes the volatile young bouquet substances. This carbon dioxide wash may also be carried out in such a manner that an excessively high carbon dioxide content is introduced into the beer after the main fermentation, making the excessive carbon dioxide and with it the volatile taste substances escape subsequently by reduction of the counterpressure perhaps with the assistance of devices causing mechanical movement or agitation of the beer. In this operation, the carbon dioxide may of course be intercepted, purified and compressed so that an excess of carbon dioxide employed in the washing operation will not be wasted.

The removal of the yeast is usually effected by filtration after the main fermentation. The non-volatile substances disturbing the taste are removed, in accordance with the invention, by a treatment with a silica gel having an adsorbing effect. The necessary albumen stability is attributed to the beer by the addition of precipitation agents, for instance tannin, or by enzymes, or by adsorbing agents. A special albumen stabilization may be refrained from if the addition of the silica gel is selected to be sufficiently high, because the silica gel removes not only the undesired taste substances but also turbidity causing albumen. The properties of the silica gel which are necessary to obtain this effect have been explained already in the foregoing.

Figure 2:
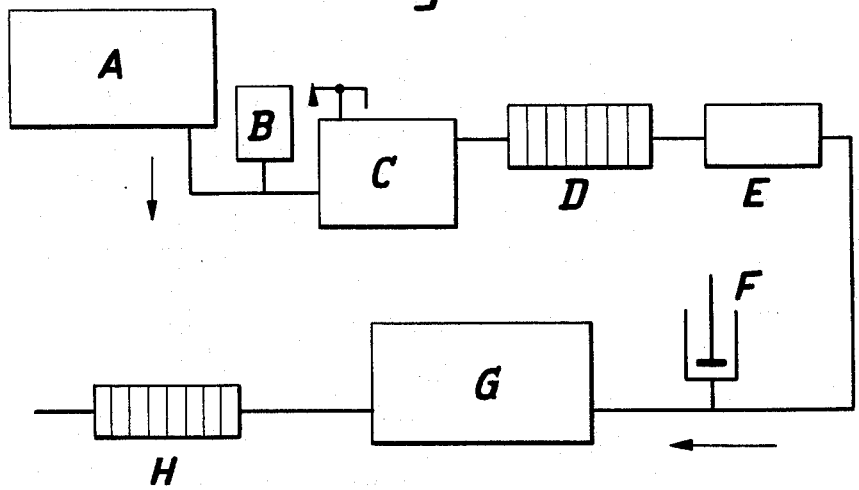

In the following, a schedule of operation is outlined with the aid of FIGS. 1 and 2 of the drawing, in which it is, however, not necessary that all the individual operations be carried out strictly in the sequence indicated.

*Example 1*

In the fermentation vessel A, beer is fermented with bottom yeast until the final degree of fermentation is nearly reached. Thereupon the beer is pumped in the direction of the arrow at first through the filter B where the yeast is filtered off. Then it is passed through the low-temperature cooling device C, where it is cooled down to a temperature of about 0° C. and below, and is subsequently carbonized at D to a carbon dioxide content higher than that desired in the end product. In the tank E in which the beer is finally introduced and in which it is allowed to stand until it is racked off, the carbon dioxide content of the beer is gradually lowered to the desired value by reducing the counterpressure. By this measure, the beer is freed from all the undesired volatile flavour substances. Finally, the beer passes the fine-mesh filter plant G on its way to the racking apparatus. In the present example, this plant is shown as being in the form of a deposit type filter with a metering device F for the filter aid. In the present example, in addition to the filter aid, the finely ground silica gel is added also at F, which removes the undesired volatile taste substances by adsorption. Said silica gel is removed again from the beer at the filter G. If the metered amounts of the silica gel which are added are selected to be sufficiently high, the beer flowing from the filter G to the racking station is satisfactory not only with respect to its flavour but also with a view to its stability to coldness.

If lower amounts of silica gel are introduced, an enzyme solution, for instance, may be introduced into the beer simultaneously by the dosage instrument F, thus bringing the albumen stability of the beer to the desired degree. In addition, the treatment of the beer with silica gel simultaneously brings about an improvement in the biological durability.

*Example 2 (FIG. 2)*

The closed tank A contains young beer the extract of which has fermented to a considerable degree. This young beer is also supersaturated with carbon dioxide, for instance by the employment of a fermentation under pressure or by the introduction of fermenting carbon dioxide. This young beer has added thereto by means of the metering device B precipitating additives such as for instance a tannin solution, for the precipitation of albumen and enzymes for albumen stabilization. The tank C serves to achieve a thorough mixing effect therein and also serves as a reaction vessel. From this tank, the beer arrives at the filter D where the albumen precipitation and the yeast are filtered off from the beer. Thereupon, the beer is cooled down to a temperature of about 0° and below at E and flows from there into the tank G. In front of this tank G, the beer is added, by means of a metering device F of silica gel. In the tank G, the proper carbon dioxide content is adjusted by lowering the pressure; thus purification of the beer of volatile disagreeable taste substances is effected during the removal of carbon dioxide. In the tank G the silica gel is also eliminated to a considerable degree by sedimentation. Finally, the beer still passes through the fine-mesh filter A and reaches the racking station from said filter A.

From the above explanations it will be seen that the silica gel in accordance with the invention may be used to enhance the albumen stability of the beer as well as to prevent or delay the microbiological decay thereof, and to shorten the time of storage of bottom-fermented beer. But the silica gel may also be used to obtain only the one or other of these effects. If, for instance, the silica gel is used only to increase the albumen stability, the beer may additionally be pasteurized to increase the durability thereof. In case the silica gel is used only to shorten the tme of storage, other means may be used as well to improve the albumen stability or the durability thereof.

The teaching of the present invention offers in addition the possibility of influencing the properties of the silica gel serving to treat the beer in dependence upon the particular conditions.

What I claim is:

1. A method of treating beer which comprises adding to said beer a finely ground silica gel in the state of a xerogel and thereafter filtering the suspension of said silica gel and said beer, said silica gel being selected from the group of silica gel species having an inner surface of 200–600 $m.^2/g.$, a pore volume of about 0.5–1.5 ml./g. and a pore diameter of about 40–180 Angstrom-units, said silica gel corresponds additionally at least to one of the following conditions:
   (a) said silica gel is coarse-porous and has an inner surface of about 200–400 $m.^2/g.$, a pore volume of about 0.5–1.2 ml./g. and a pore diameter of about 60–150 Angstrom-units,
   (b) the reaction of said silica gel extends from weakly acid to neutral in such a way that a 5% suspension in distilled water has a pH value of more than 4.0 and less than 8.0,
   (c) said silica gel is ground to such an extent that at least 75% by weight pass through a screen of 325 mesh (sieve opening 0.044 mm.).

2. A method of treating beer which comprises introducing into said beer a finely ground silica gel in the state of a xerogel to form a suspension and thereafter separating said suspension of silica gel and beer, said silica gel having an inner surface of about 200–600 $m.^2/g.$, a pore volume of about 0.5–1.5 ml./g. and a pore diameter of about 40–180 Angstrom-units, said silica gel being carefully washed with water before being added to said beer to such an extent that said silica gel has a pH value of more than 4.0 and less than 8.0.

3. A method of treating beer which comprises contacting said beer with finely ground silica gel in the state of a xerogel and thereafter filtering said suspension of silica gel and beer and separating said silica gel from said beer, said silica gel having an inner surface of 200–600 $m.^2/g.$, a pore volume of about 0.5–1.5 ml./g. and a pore diameter of about 40–180 Angstrom-units, said silica gel being subjected to an after-treatment with acid and being thereafter subjected to a washing process with water before adding to said beer, said washing process with water being continued until the final dry silica gel will have a pH-value of 4.0–8.0 in a 5% suspension in distilled water.

4. A method of treating beer which comprises introducing into said beer a finely ground silica gel in the state of a xerogel to form a suspension and thereafter separating said suspension of silica gel and beer, said silica gel having an inner surface of 200–600 $m.^2/g.$, a pore volume of about 0.5–1.5 ml./g. and a pore diameter of about 40–180 Angstrom-units, said silica gel being ground to such an extent that at least 90% by weight pass through a screen of 325 mesh (sieve opening 0.044 mm.).

5. A method of treating beer as claimed in claim 1 with the aim to shorten the storage time of fresh beer after its fermentation in a fermenting vessel which comprises pursuing the fermentation of said fresh beer in said fermenting vessel until having reached about the desired tapping degree of fermentation, washing said fresh beer with carbon dioxide gas for removing the volatile young bouquet substances from said fresh beer, adding to said fresh beer said finely ground silica gel in the state of a xerogel, filtering the suspension of said silica gel and said fresh beer, and tapping said beer.

6. A method of treating beer as claimed in claim 1 with the aim to shorten the storage time of fresh beer after its fermentation in a fermenting vessel which comprises inducing the fermentation of said fresh beer in said fermenting vessel until having reached about the desired tapping degree of fermentation, increasing the pressure during said fermentation to a value lying above the atmospheric pressure for the purpose of increasing the carbon dioxide content of said fresh beer to a value in excess of the desired carbon dioxide content of the final beer to be tapped, reducing said increased pressure after said fermentation with the aim to release a part of the carbon dioxide dissolved in said beer, adding to said beer said finely ground silica gel, filtering the suspension of said silica gel and said beer, and tapping said beer.

7. A method as claimed in claim 6 which comprises agitating said beer during said pressure reducing step.

8. A method as claimed in claim 6 removing said beer from said fermenting vessel and simultaneously separating the fermenting agent from said beer.

9. A method of treating beer as claimed in claim 1 with the aim to shorten the storage time of fresh beer after its fermentation in a fermenting vessel which comprises conveying the fermentation of said fresh beer in said fermenting vessel until having reached about the desired tapping degree of fermentation, increasing the pressure after said fermentation to a value lying above the atmospheric pressure and introducing carbon dioxide into said beer for the purpose of increasing the carbon dioxide content of said fresh beer to a value in excess of the desired carbon dioxide content of the final beer to be tapped, reducing said increased pressure with the aim to release a part of the carbon dioxide dissolved in said beer, adding to said beer said finely ground silica gel filtering the suspension of said silica gel and said beer, and tapping said beer.

10. A method as claimed in claim 9 which comprises agitating said beer during said pressure reducing step.

11. A method as claimed in claim 9 which comprises removing said beer from said fermenting vessel and simultaneously separating the fermenting agent from said beer.

References Cited by the Examiner
UNITED STATES PATENTS

| | | | |
|---|---|---|---|
| 2,316,241 | 4/43 | Heimann | 99—48 |
| 2,416,007 | 2/47 | Joachim | 99—48 |
| 3,053,669 | 9/62 | Quest et al. | 99—48 |
| 3,071,469 | 1/63 | Krabbe et al. | 99—48 |

A. LOUIS MONACELL, *Primary Examiner.*

ABRAHAM H. WINKELSTEIN, *Examiner.*

UNITED STATES PATENT OFFICE
CERTIFICATE OF CORRECTION

Patent No. 3,163,538 December 29, 1964

Karl J. Raible

It is hereby certified that error appears in the above numbered patent requiring correction and that the said Letters Patent should read as corrected below.

In the heading to the printed specification, line 9, for "June 26, 1962" read -- June 22, 1962 --.

Signed and sealed this 22nd day of June 1965.

(SEAL)
Attest:

ERNEST W. SWIDER
Attesting Officer

EDWARD J. BRENNER
Commissioner of Patents